United States Patent
Peda

[11] Patent Number: 6,044,884
[45] Date of Patent: Apr. 4, 2000

[54] PNEUMATIC VEHICLE TIRE HAVING REINFORCED SIDEWALLS FOR IMPROVED EMERGENCY RUNNING PROPERTIES

[75] Inventor: Karl Peda, Wunstorf, Germany

[73] Assignee: Continental Aktiengesellschaft, Germany

[21] Appl. No.: 09/087,614

[22] Filed: May 29, 1998

[30] Foreign Application Priority Data

May 30, 1997 [DE] Germany .......................... 197 22 521

[51] Int. Cl.⁷ ...................................... B60C 3/00
[52] U.S. Cl. .................. 152/454; 152/522; 152/544; 152/546; 152/555; 152/379.3; 152/379.4
[58] Field of Search .................. 152/517, 522, 152/555, 379.3, 379.5, 380, 454, 379.4, 544, 546, 158

[56] References Cited

U.S. PATENT DOCUMENTS

| Re. 29,089 | 12/1976 | Edwards ................................ 152/522 |
| 3,486,547 | 12/1969 | Powers ................................. 152/454 |
| 3,954,131 | 5/1976 | Hoshino et al. . |
| 4,077,455 | 3/1978 | Curtiss, Jr. et al. .................. 152/454 |
| 4,261,405 | 4/1981 | Yamauchi et al. . |
| 4,328,851 | 5/1982 | Randle ................................ 152/330 |
| 4,794,970 | 1/1989 | Huinink et al. ....................... 152/158 |
| 5,394,918 | 3/1995 | Kogure ................................. 152/523 |
| 5,685,927 | 11/1997 | Hammond et al. .................... 152/209 |
| 5,769,980 | 6/1998 | Spragg et al. ........................ 152/517 |
| 5,795,416 | 8/1998 | Willard, Jr. et al. .................. 152/517 |

FOREIGN PATENT DOCUMENTS

| 0140074 | 5/1985 | European Pat. Off. . |
| 2357140 | 5/1974 | Germany . |
| 2720265 | 11/1977 | Germany . |
| 3246131 | 6/1984 | Germany . |
| 8702348 | 7/1988 | Germany . |
| 64-67405 | 3/1989 | Japan ................................ 152/555 |

Primary Examiner—Michael W. Ball
Assistant Examiner—Barbara J Musser
Attorney, Agent, or Firm—Robert W. Becker & Associates

[57] ABSTRACT

A pneumatic vehicle tire has a carcass with at least one radial ply and beads having bead cores, whereby the carcass is anchored to the bead cores. A multi-ply belt is positioned radially outwardly on the carcass, and a tread is positioned radially outwardly on the belt. Sidewalls extend between the tread and the beads. The sidewalls have a first portion extending from the beads outwardly at an angle of 0% to 20% relative to the axial direction of the tire. The sidewalls have increased stiffness within the area of 50% to 90% of a tire height measured in a direction from the bead to the tread. The area of 50% to 90% prevents the sidewalls from touching the road surface when the tire is deflated and compressed.

16 Claims, 2 Drawing Sheets

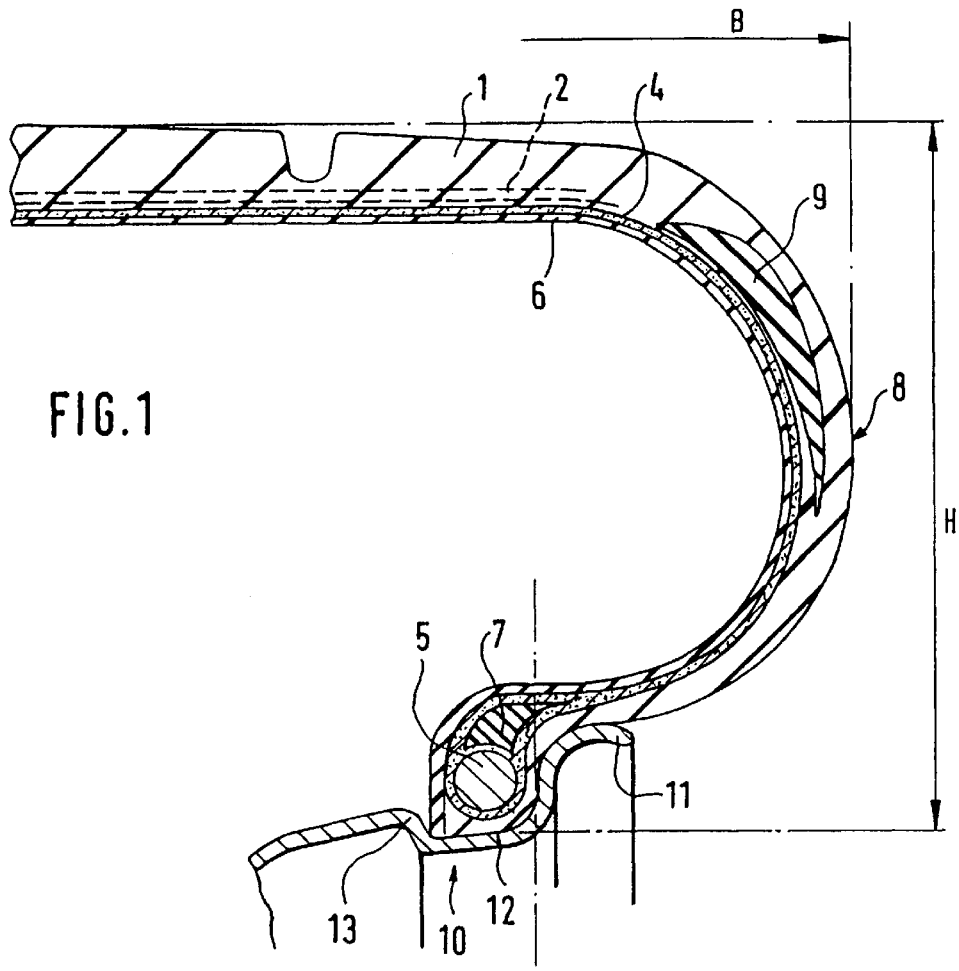
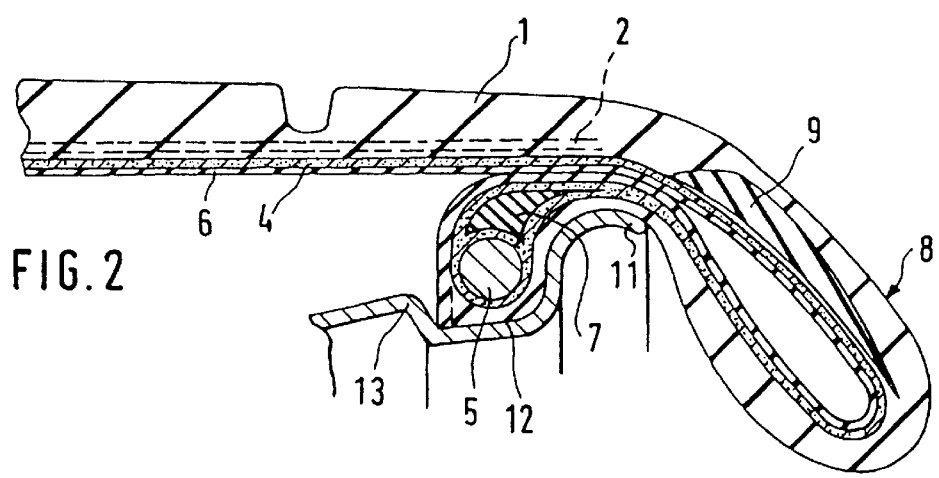

PNEUMATIC VEHICLE TIRE HAVING REINFORCED SIDEWALLS FOR IMPROVED EMERGENCY RUNNING PROPERTIES

BACKGROUND OF THE INVENTION

The present invention relates to a pneumatic vehicle tire of radial carcass construction having a carcass of at least one ply connected in the bead area to the bead corse, further comprising especially a multi-ply belt, a tread strip with tread pattern, and sidewalls, whereby each sidewall, beginning at the bead area, extends relatively flat, at an angle of 0° to 20°, in the axial direction outwardly.

Such a tire is known from European patent application 0 140 074 whereby this tire comprises bead cores which are eccentrically arranged in the bead area so that for a mounted tire the inner tire diameter in the bead area is smaller than in the tire before mounting. This tire is mounted onto a wheel rim which is provided with a support part arranged axially within the seat of the wheel rim, whereby this support part has a diameter that is greater than the diameter of the wheel flange. In the emergency running position, i.e., in the case of a flat tire, the tire is supported with its inner wall at the support part of the wheel rim. Due to the very flat extension of the tire sidewalls in the area of the wheel flanges, the sidewalls will curve laterally outwardly, and contact with the road surface or contact with the inner sidewall is prevented.

In another known solution of the prior art for providing emergency running properties, the wheel rim is designed such that it has radially inwardly extending wheel flanges and, in addition, is provided at its inner circumference with seats for the bead area of the tire. For such a solution, known, for example, from German patent application 32 46 131, the outer radial mantle surface of the wheel is additionally used as a support surface for the tire under emergency running conditions. This known solution for ensuring at least minimal driveablity when the tire is deflated requires specially designed wheel rims, especially also providing support surfaces at the wheel rims.

It is an object of the present invention to design a tire of the aforementioned kind such that it can be driven when deflated at least for a certain distance whereby mounting of the tire on a standard (conventional) wheel rim according to conventional mounting methods is possible.

SUMMARY OF THE INVENTION

The tire of the present invention is primarily characterized by;
- a carcass with at least one radial ply;
- beads having bead cores;
- the carcass anchored to the bead cores;
- a multi-ply belt positioned radially outwardly on the carcass;
- a tread positioned radially outwardly on the belt;
- sidewalls extending between the tread and the beads;
- the sidewalls having a first portion extending from the beads outwardly at an angle of 0° to 20° relative an axial direction of the tire;
- the sidewalls having increased stiffness within an area of 50% to 90% of a tire height measured in a direction from the bead to the tread;
- the area of 50% to 90% preventing the sidewalls from touching the road surface when the tire is deflated and compressed.

Advantageously, the sidewalls have a greater bending resistance in the area of 50% to 90% than outside this area.

The bending resistance decreases from the tread to the beads, preferably uniformly.

The tire may further comprise reinforcement fillers embedded in the sidewalls in the area of 50% to 90%.

Advantageously, the reinforcement fillers consist of rubber material of a Shore hardness of 70 and greater.

The reinforcement fillers are arranged between the carcass and the sidewall rubber. The carcass has preferably multiple plies and the reinforcement fillers are positioned between the carcass plies.

The sidewalls may comprise at least one fabric reinforcement layer comprising reinforcement elements extending at an acute angle to reinforcement elements of the radial carcass.

Advantageously, the acute angle is 20° to 70°.

Expediently, a plurality of fabric reinforcement layers are provided having different widths in a radial direction of the tire.

The sidewalls have a thickness that continuously decreases from the tread to the beads.

The beads further comprise fillers having a length of up to 2.5 times the diameter of the bead cores measured in the direction of extension of the fillers.

The present invention also relates to a wheel comprising a wheel rim having seat and a pneumatic vehicle tire connected to the seats of the wheel rim. The tire comprises a carcass with at least one radial ply, beads having bead cores, whereby the carcass is anchored to the bead cores. A multi-ply belt is positioned radially outwardly on the carcass, and a tread is positioned radially outwardly on the belt. The sidewalls extend between the tread and the beads. The sidewalls have a first portion extending from the beads outwardly at an angle of 0° to 20° relative to the axial direction of the tire. The sidewalls have increased stiffness within an area of 50% to 90% of a tire height measured in the direction from the bead to the tread, wherein the area of 50% to 90% prevents the sidewalls from touching the road surface when the tire is deflated and compressed.

Preferably, the tire is secured in the area of the seats of the wheel rim by securing devices.

The securing devices are preferably asymmetrical humps positioned adjacent to the seats.

According to the present invention, the tire sidewalls within the area between 50% and 90% of the height of the tire are stiffest so that in the compressed and deflated state of the tire the sidewalls cannot contact the road surface.

Due to the inventive embodiment of the tire sidewalls including the flat transition portion from the bead to the sidewall, which allows supporting of the inner tire wall in the area radially within the tread strip on the bead area, the tire sidewalls when deflated can be deformed such that the sidewall forms a fold which projects away from the road surface. The tire sidewalls thus do not contact the road surface. The wheel rim on the which the tire is mounted can be a standard wheel rim.

In a preferred embodiment of the invention the sidewalls have a higher bending stiffness within the area of 50% to 90% of the height of the tire as compared to areas outside of this range, preferably such that the bending stiffness of the sidewalls decreases from the belt to the bead area, especially uniformly. This is especially advantageous for the driving behavior and driving comfort of the tire.

In an another preferred embodiment of the invention each sidewall within the area of 50% to 90% of the tire height has reinforcement fillers arranged therein. The placement of such a reinforcement filler within the tire sidewall is relatively simple with respect to manufacturing considerations.

Also, the cross-section of the reinforcement filler and its material can be advantageously used for correspondingly adjusting and influencing the bending stiffness of the tire sidewalls. In this context it is also advantageous when the reinforcement filler is comprised of a rubber having a Shore hardness A greater than 70.

The reinforcement filler can be positioned between the carcass and the sidewall rubber, but also, when a multi-ply, especially two-ply, carcass is being used, between two carcass plies.

In an alternative embodiment of the invention for influencing the bending stiffness of the sidewalls, at least one fabric ply is embedded in each tire sidewall. Especially a plurality of fabric layers having different widths are provided. These reinforcement layers are preferably arranged also in the area of 50% to 90% of the height of the tire.

As an additional measure which affects the bending stiffness in conformity with the present invention, other tire properties, for example, the driving comfort of the tire can be favorably affected when the tire sidewalls are designed such that their thickness decreases from the shoulder area toward the bead area.

In the bead areas of the inventively designed tires a filler is not necessary. However, for a sufficient stiffness of the bead area, it may be advantageous to provide such fillers which can be relatively short and, viewed in the radial direction, can have a height which is maximally 2.5 times the diameter of the bead core measured in this direction.

The present invention also relates to a vehicle wheel including the inventively designed tire. Preferably, the tire when deflated is secured in the area of the seats of the wheel rim by securing devices, for example, asymmetrically designed humps.

BRIEF DESCRIPTION OF THE DRAWINGS

The object and advantages of the present invention will appear more clearly from the following specification in conjunction with the accompanying drawings, in which:

FIG. 1 shows a radial section of one half of a tire mounted on a wheel rim;

FIG. 2 shows the tire according to FIG. 1 in an emergency running position;

DESCRIPTION OF PREFERRED EMBODIMENTS

Figure 3:
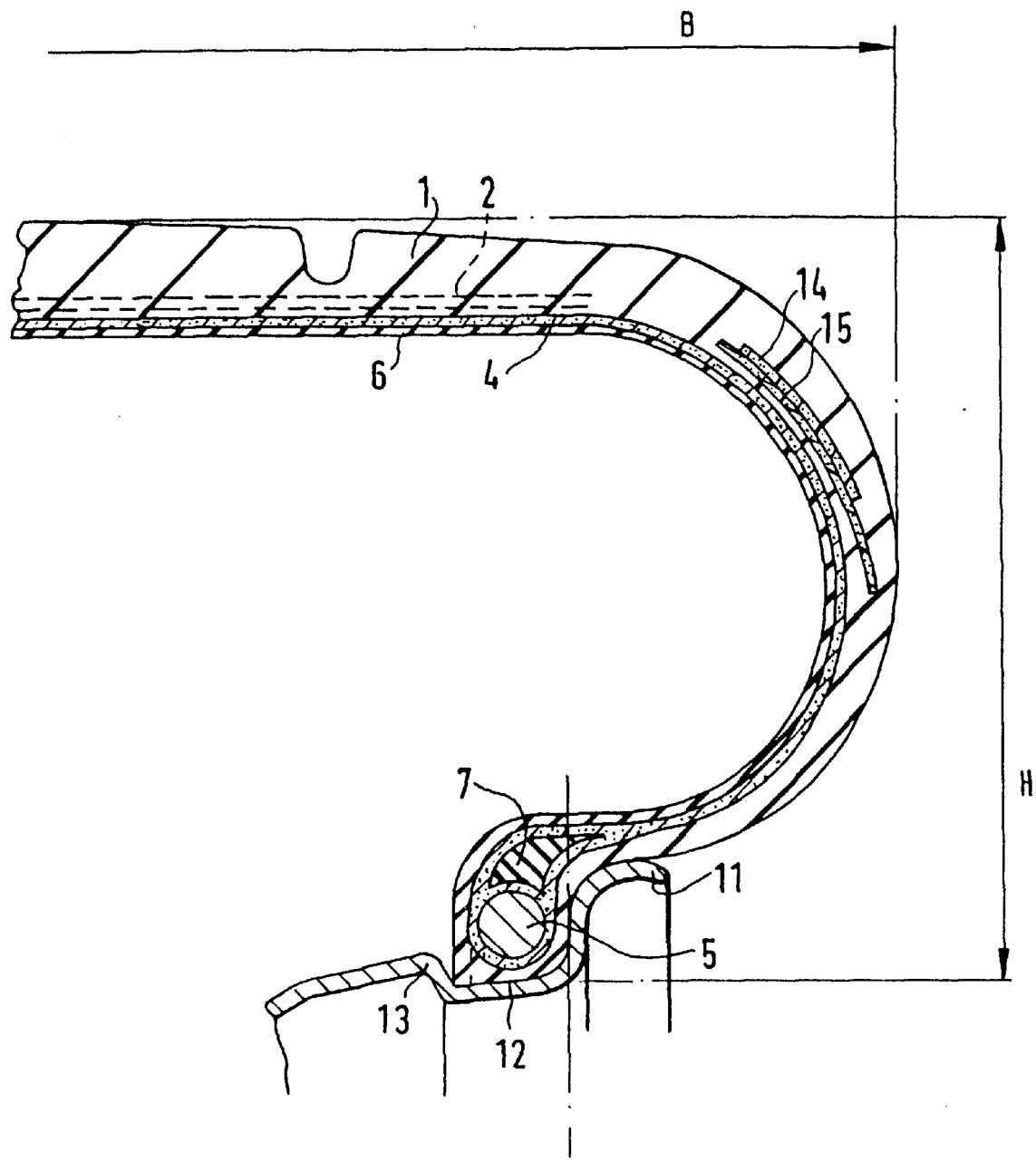
FIG. 3 shows a second embodiment of the inventive tire mounted on a wheel rim also in a radial cross-sectional view.

The present invention will now be described in detail with the aid of several specific embodiments utilizing FIGS. 1 through 3.

It should be noted that all of the subsequently mentioned dimensions and sizes of individual tire parts refer to the geometry of the inflated tire in a load-free condition while mounted on a wheel rim, and, if applicable, correspond to ETRTO standards.

The vehicle wheel represented in FIG. 1 is comprised of a passenger car radial tire and a rigid wheel rim. The tire comprises a tread strip 1 with pattern, a belt 2 comprised of two belt plies, a carcass 4 with textile and/or metallic reinforcement elements embodied as a one- or multi-ply carcass whereby the plies are anchored to the bead cores 5 within the bead areas of the tire by winding the plies about the bead cores. An inner plate (liner) 6 and sidewalls 8 are also provided whereby the sidewalls 8 not only include the sidewall rubber (applied during manufacture of the tire) but also the portion of the tire extending between the belt and the bead area, including the inner plate, the carcass etc.

The wheel rim 10 which is preferably comprised of metal and is of a unitary construction can be a standard (conventional) wheel rim and has laterally outwardly positioned wheel flanges 11, seats 12 for the tire beads, and a respective hump 13 adjacent thereto. The wheel rim 10 is a full drop center rim. The height of the tire is to be measured from the corner point diameter of the wheel rim and is identified in the drawings by letter H, while the greatest width of the tire is indicated in the drawing by letter B.

As mentioned above, the present invention deals with making it possible to drive with the inventive tire when deflated, i.e., when a vehicle has a flat tire, for extended distances in comparison to conventional tires. It is to be prevented that the tire sidewalls when the tire is deflated come into contact with the road surface, which is the case for conventional tires so that they are destroyed or greatly damaged within a short period of time.

The sidewalls 8 of the tire are designed such that within their area of 50% to 90% of the tire height H they have the greatest stiffness. Within this area, the tire sidewalls 8 have a greater bending stiffness than in other areas which extend toward the bead area.

The sidewalls 8 are designed such that their bending stiffness, preferably beginning at the edge of the widest belt ply and extending to the two bead areas, especially to the first contact location at the wheel flange, decreases uniformly.

In order to prevent during emergency running conditions contacting of the tire sidewalls with the road surface, the tire is designed such that the tire sidewalls 8, respectively, the carcass 4 in the respective bead areas, are very flat so that the transition from the bead area to the adjacently positioned sidewall 8 extends substantially in the axial direction. The angle to the axial direction is approximately 0° to 20°, preferably between 0° and 10°. In the direction toward the tread each tire sidewall 8 has an arc-shaped design.

In the embodiments represented in the drawing, radially outwardly of each bead core 5 a filler 7 is provided which is very short, and, viewed in the radial direction, has an extension that is maximally 2.5 times the bead core diameter measured in this direction. The inventively designed tire may also be constructed without such fillers.

In order to provide the desired bending stiffness of the sidewalls 8, they are stiffened. For this purpose, a plurality of options is available, whereby in FIG. 1 and FIG. 3 two of these options are represented. As shown in FIG. 1, in each sidewall 8, preferably within the aforementioned area, a reinforcement filler 9 is embedded. Preferably, this reinforcement filler 9 extends from the edge area of the widest belt ply to the location of maximum transverse width B, but can also extend to the bead area. The reinforcement filler 9 is comprised of rubber and manufactured of a suitable rubber mixture. The Shore hardness A of the reinforcement filler 9 is especially greater than 70. When viewed in cross-section, the reinforcement filler 9 is designed such that it has a widest location which is positioned slightly radially inwardly of the belt 2 from where its thickness to the two end portions is decreased continuously. When building the tire, the reinforcement filler 9 can be directly placed onto the carcass 4 so that it is positioned between the carcass ply and the sidewall rubber. Alternatively, a second carcass ply can be provided whereby the reinforcement filler 9 is positioned between the two carcass plies.

FIG. 2 shows the tire of FIG. 1 in a deflated state, i.e., during an emergency running situation. Due to the greater bending stiffness of the sidewall 8 in the area adjacent to the belt and the inventive contour in the transition portion from the bead to the sidewall, a sidewall fold is formed which bends away from the road surface in the direction toward the wheel rim so that no contact between the tire sidewall and the road is possible. The inventively designed transition portion between bead and sidewall provides for a supporting action of the beads within the tire in the area of the tread edge portion so that a deformation of the aforementioned sidewall fold is favored. It is favorable when the inner wall of the tire is provided with a lubricant coating and the interior of the tire is provided with a corresponding lubricant paste.

For the driving behavior and the comfort properties of the tire during normal operation, it is advantageous when the sidewalls 8 are designed such that their bending stiffness from the belt to the bead area decreases as uniformly as possible. In this context it is also advantageous when the tire sidewall is designed such that its thickness beginning at the shoulder area and extending toward the bead area decreases continuously.

In order to prevent that in the deflated state of the tire the beads slip into the full drop center of the wheel rim, only such wheel rims should be used which have a correspondingly designed hump, respectively, as shown in the drawings, wheel rims with asymmetric humps. Alternatively, it may also be considered to provide other means for securing the tire beads at the seats of the rear rim, for example, by providing an adhesive.

A further embodiment of the invention is shown in FIG. 3. In this embodiment, the bending stiffness of the tire sidewalls is created in that in each tire sidewall at least one separate fabric ply 14, 15 is positioned, in the shown embodiment two such plies. As a material for such fabric plies textile cords, such as rayon, nylon, polyester or aramid can be used. The reinforcement elements in these plies 14, 15 extend at an angle of 20° to 70° to the radially extending carcass reinforcement elements whereby for multiple plies the reinforcement elements of the plies are in a crossed arrangement. In the embodiment represented in FIG. 3 a reinforcement layer or ply 14 is arranged extending from the edge area of the widest belt ply to a location slightly above the location of the greatest tire width, whereby the reinforcement layer or ply 14 is positioned on the carcass ply. A second reinforcement layer or ply 15 which has an extension of ⅔ of the extension of the first reinforcement ply 14 is applied directly onto the first reinforcement ply. The radially outer end areas of the two reinforcement plies 14, 15 are positioned substantially at the same height. In addition, a variation of the thickness of the tire sidewalls can ensure that the decrease of the bending stiffness of the sidewalls is as uniform as possible.

There is a number of further possibilities for influencing the bending stiffness of the sidewalls as desired. It is, for example, possible to combine the reinforcement filler with additional reinforcement plies or to arrange more than two reinforcement plies in the tire sidewall. Also, a combination of different materials in different reinforcement plies can be used for influencing respectively the bending stiffness of the sidewall. It is also possible to design the reinforcement fillers such that they are comprised of two or more different rubber mixtures of different Shore hardness such that the bending stiffness is affected in the desired amount and in the desired manner.

The specification incorporates by reference the disclosure of German priority document 197 22 521.7-16 of May 30, 1997.

The present invention is, of course, in no way restricted to the specific disclosure of the specification and drawings, but also encompasses any modifications within the scope of the appended claims.

What is claimed is:

1. A pneumatic vehicle tire comprising:

a carcass with at least one radial ply;

beads having bead cores;

said carcass anchored to said bead cores;

a multi-ply belt positioned radially outwardly on said carcass;

a tread positioned radially outwardly on said belt;

sidewalls extending between said tread and said beads;

said sidewalls having a first portion extending from said beads outwardly at an angle of 0 to 20° relative to an axial direction of said tire;

said sidewalls having increased stiffness only within an area of 50% to 90% of a tire height measured in a direction from said bead to said tread;

said sidewalls folding when said tire is deflated and compressed such that said beads rest at an inner side of said tread and said first portion and said area of 50% to 90% are doubled over, wherein said area of 50% to 90% prevents said sidewalls from touching the road surface by extending angularly away from said tread in a radially inward and axially outward direction.

2. A tire according to claim 1, wherein said sidewalls have a greater bending resistance in said area of 50% to 90% than outside said area.

3. A tire according to claim 2, wherein said bending resistance decreases from said tread to said beads.

4. A tire according to claim 3, wherein said bending resistance decreases uniformly.

5. A tire according to claim 1, further comprising reinforcement fillers embedded in said sidewalls in said area of 50% to 90%.

6. A tire according to claim 5, wherein said reinforcement fillers consist of rubber material of a Shore hardness of 70 and greater.

7. A tire according to claim 5, wherein said reinforcement fillers are arranged between said carcass and rubber of said sidewalls.

8. A tire according to claim 5, wherein said carcass has multiple plies and wherein said reinforcement fillers are positioned between said carcass plies.

9. A tire according to claim 1, wherein said sidewalls comprise at least one fabric reinforcement layer comprising reinforcement elements extending at an acute angle to reinforcement elements of said radial carcass.

10. A tire according to claim 9, wherein said acute angle is 20° to 70°.

11. A tire according to claim 9, wherein a plurality of said fabric reinforcement layers are provided having different widths in a radial direction of said tire.

12. A tire according to claim 1, wherein said sidewalls have a thickness that continuously decreases from said tread to said beads.

13. A tire according to claim 1, wherein said beads further comprise fillers having a length up to 2.5 times a diameter of said beads cores measured in a direction of extension of said fillers.

14. A wheel comprising a wheel rim having seats and a pneumatic vehicle tire connected to said seats of said wheel rim, said tire comprising:

a carcass with at least one radial ply;

beads having bead cores;

said carcass anchored to said bead cores;

a multi-ply belt positioned radially outwardly on said carcass;

a tread positioned radially outwardly on said belt;

sidewalls extending between said tread and said beads;

said sidewalls having a first portion extending from said beads outwardly at an angle of 0 to 20° relative to an axial direction of said tire;

said sidewalls having increased stiffness only within an area of 50% to 90% of a tire height measured in a direction from said bead to said tread;

said area of 50% to 90% preventing said sidewalls from touching the road surface when said tire is deflated and compressed, said sidewalls folding when said tire is deflated and compressed such that said beads rest at an inner side of said tread and said first portion and said area of 50% to 90% are doubled over, wherein said area of 50% to 90% prevents said sidewalls from touching the road surface by extending angularly away from said tread in a radially inward and axially outward direction.

15. A wheel according to claim 14, wherein said tire is secured in an area of seats of said wheel rim by securing devices.

16. A wheel according to claim 15, wherein said securing devices are asymmetrical humps positioned adjacent to said seats.

* * * * *